(12) United States Patent
Yamamoto et al.

(10) Patent No.: US 12,295,346 B2
(45) Date of Patent: May 13, 2025

(54) ANIMAL TOILET

(71) Applicant: Unicharm Corporation, Ehime (JP)

(72) Inventors: Hiroki Yamamoto, Kanonji (JP); Chiyo Takai, Kanonji (JP); Yuki Koido, Kanonji (JP); Yasuhiro Sasano, Kanonji (JP); Shinya Kaneko, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 377 days.

(21) Appl. No.: 17/612,282

(22) PCT Filed: Jul. 29, 2019

(86) PCT No.: PCT/JP2019/029705
§ 371 (c)(1),
(2) Date: Nov. 18, 2021

(87) PCT Pub. No.: WO2020/235114
PCT Pub. Date: Nov. 26, 2020

(65) Prior Publication Data
US 2022/0256804 A1    Aug. 18, 2022

(30) Foreign Application Priority Data
May 20, 2019   (JP) .................... 2019-094808

(51) Int. Cl.
*A01K 1/01*      (2006.01)
(52) U.S. Cl.
CPC ................. *A01K 1/0114* (2013.01)

(58) Field of Classification Search
CPC .... A01K 1/0107; A01K 1/0114; A01K 1/011; A01K 1/0125
(Continued)

(56) References Cited

U.S. PATENT DOCUMENTS 920,975 A  *  5/1909  Minion ................. A01K 1/033
                                                  119/482
3,482,546 A  * 12/1969  Anderson ............ A01K 1/0114
                                                  119/166
(Continued)

FOREIGN PATENT DOCUMENTS

CN       101730463 A      6/2010
CN       104507303 A      4/2015
(Continued)

OTHER PUBLICATIONS

Merged translation of JP_4447517 (Year: 2010).*
(Continued)

*Primary Examiner* — Morgan T Jordan
(74) *Attorney, Agent, or Firm* — Fredrikson & Byron, P.A.

(57) ABSTRACT

An animal toilet (1) has: a main body (10) provided with a urine passing section (12); and a tray (20) on which an absorbent body (200) for absorbing urine passing through the urine passing section (12) is disposed. In a lower end portion on one side in the front-rear direction of the main body (10), an opening (19) for accommodating the tray (10) is formed. In the left-right direction, the length of the opening (19) is longer than the length of the tray (20). In a state where the tray (20) is accommodated in the main body (10), both a bottom section (15d) of the main body and a bottom section (27) of the tray are grounded.

8 Claims, 14 Drawing Sheets

(58) Field of Classification Search
USPC .................................................. 119/166, 165
See application file for complete search history.

(56) References Cited

U.S. PATENT DOCUMENTS

| | | | | |
|---|---|---|---|---|
| 5,094,188 | A * | 3/1992 | Wolak | A01K 1/0125 119/168 |
| 5,419,282 | A * | 5/1995 | Dennis | A01K 1/0114 119/168 |
| 5,522,347 | A * | 6/1996 | Merino | A01K 1/0107 119/165 |
| 5,572,950 | A * | 11/1996 | O'Rourke | A01K 1/0107 119/165 |
| 5,598,810 | A * | 2/1997 | Lawton, III | A01K 1/0114 119/166 |
| 5,601,052 | A * | 2/1997 | Rood | A01K 1/0114 119/166 |
| 5,823,137 | A * | 10/1998 | Rood | A01K 1/0114 119/168 |
| 6,196,161 | B1 * | 3/2001 | Thurber | A01K 1/0245 119/497 |
| 7,856,945 | B2 * | 12/2010 | Matsuo | A01K 1/0107 119/168 |
| 2002/0037614 | A1 * | 3/2002 | Carlisi | A01K 1/011 438/241 |
| 2004/0261727 | A1 * | 12/2004 | Matsuo | A01K 1/0107 119/170 |
| 2006/0037548 | A1 * | 2/2006 | Mohr | A01K 1/0107 119/166 |
| 2013/0269622 | A1 * | 10/2013 | Charette | A01K 1/0114 294/1.3 |
| 2017/0231190 | A1 * | 8/2017 | Brawn | A01K 1/0114 119/166 |
| 2018/0192610 | A1 | 7/2018 | Petty et al. | |
| 2018/0199535 | A1 | 7/2018 | Chevigny et al. | |
| 2018/0220619 | A1 * | 8/2018 | Takagi | A01K 1/0114 |
| 2020/0229392 | A1 * | 7/2020 | Takai | A01K 1/0107 |
| 2022/0104453 | A1 * | 4/2022 | Day | A01K 1/0125 |
| 2023/0051699 | A1 * | 2/2023 | Okawa | A01K 1/011 |

FOREIGN PATENT DOCUMENTS

| | | | | |
|---|---|---|---|---|
| CN | 105307481 | A | 2/2016 | |
| CN | 107249314 | A | 10/2017 | |
| CN | 207744534 | U | 8/2018 | |
| JP | 2002109 | A | 1/2002 | |
| JP | 3088484 | U | 9/2002 | |
| JP | 3981123 | B2 | 9/2007 | |
| JP | 2009017819 | A | 1/2009 | |
| JP | 4447517 | B2 * | 4/2010 | A01K 1/0107 |
| JP | 2011004664 | A | 1/2011 | |
| JP | 5362966 | B2 | 12/2013 | |
| JP | 6173145 | B2 | 8/2017 | |
| KR | 20120008819 | U * | 12/2012 | |
| WO | WO-2014196418 | A1 * | 12/2014 | A01K 1/0114 |
| WO | 2016139965 | A1 | 9/2016 | |

OTHER PUBLICATIONS

English Abstract and Machine Translation for Japanese Publication No. JP2009017819A, published Jan. 29, 2009, 16 pgs.

Extended European Search Report for European Application No. EP19929284.8, mailed Apr. 12, 2022, 9 pgs.

PCT/ISA/210 and 237 dated Oct. 15, 2019 for PCT Application No. PCT/JP2019/029705, from which the instant application is based, 14 pgs.

Office Action dated Aug. 19, 2019 for related Japanese Application No. 2019-140009, with English Translation, 12 pgs.

Office Action dated Oct. 1, 2019 for related Japanese Application No. 2019-140009, with English Translation, 8 pgs.

Japanese Patent Application No. 2019-094808, filed May 20, 2019 (Publication No. JP 2020-188696 A, published Nov. 26, 2020), with English Machine Translation, 56 pgs.

English Translation of Notice of Reasons for Refusal mailed by Japan Patent Office (JPO) for corresponding Application No. JP2019-094808, dated Oct. 26, 2022, 4 pages.

Untranslated Notice of Reasons for Refusal mailed by Japan Patent Office (JPO) for corresponding Application No. JP2019-094808, dated Oct. 26, 2022, 2 pages.

Untranslated First Office Action mailed by Chinese Patent Office for Application No. CN201980096588.6, Jul. 7, 2022, 8 pages.

English Abstract and Machine Translation for Chinese Publication No. CN101730463A, published Jun. 9, 2010, 16 pgs.

English Abstract and Machine Translation for Chinese Publication No. CN105307481A, published Feb. 3, 2016, 18 pgs.

English Abstract and Machine Translation for Chinese Publication No. CN104507303A, published Apr. 8, 2015, 34 pgs.

English Abstract and Machine Translation for Chinese Publication No. CN207744534U, published Aug. 21, 2018, 12 pgs.

English Abstract and Machine Translation for Chinese Publication No. CN107249314A, published Oct. 13, 2017, 25 pgs.

Japanese Patent Office, "Notice of Reasons for Refusal (with English translation)" from JP Application No. 2022-203371, mailed Feb. 6, 2024, pp. 10.

Japan Patent Office "Final Notification of Reasons for Refusal (with English Translation)" From Japanese Patent Application No. 2022-203371, Dated Jul. 22, 2024, pp. 10.

* cited by examiner

L-L CROSS-SECTION

ANIMAL TOILET

RELATED APPLICATIONS

This application is a 35 U.S.C. 371 national phase filing from International Application No. PCT/JP2019/029705, filed Jul. 29, 2019, which claims priority to Japanese Application No. 2019-094808, filed May 20, 2019, the contents of which are incorporated herein by reference.

FIELD

The present invention relates to an animal litter box.

BACKGROUND

Animal litter boxes for use by animals (pets) such as cats are conventionally been known. For example. Patent Literature 1 discloses an animal litter box configured with three members, namely an outer container 5 having an opening at an upper part, an inner container 6 detachably attached to the inside of the outer container 5 (the upper part of the outer container 5) and provided with a urine-permeable partition layer 3 through which urine excreted by pets passes, and a tray 4 as a container that receives urine having passed through the partition layer 3 and is accommodated in the outer container 5.

CITATION LIST

Patent Literature

Patent Literature Is Japanese Patent. Application Publication No. 2011-4664

SUMMARY

Technical Problem

Because the animal litter box of Patent Literature 1 is configured with three members, the overall height of the litter box is likely to increase, which leads to a risk that kittens, short legged animals, and the like will not easily enter the litter box. Furthermore, there is a problem in that cleaning and maintenance require much work; for example, the three members need to be cleaned individually, and gaps between the members are clogged with cat litter.

In recent years, the cases where a pet owner keeps and cares his/her animal (e.g., a kitten) in a cage increases. Therefore, in some cases, an animal litter box is installed in such a cage. In such a style of keeping an animal in a cage, it is desirable that the cleaning of the animal litter box or the replacing of an absorbent sheet arranged in the tray can be performed in the cage. However, for the conventional animal litter box, it is difficult to perform the cleaning, replacing of the absorbent sheet, and the like in a small space such as the inside of a cage. Therefore, the user needs to first take the animal litter box out of the cage for the cleaning or replacing, which is a large burden for the user (pet owner).

The present invention was achieved in light of problems such as that described above, and an aspect of the present invention is to provide an animal litter box which is configured with few members and enables a user to easily perform operations such as the replacing of an absorbent sheet even in a small space.

Solution to Problem

A main aspect of the present invention for solving the above-described aspect is an animal litter box having a front-rear direction, a lateral direction, and a vertical direction intersecting each other, the animal litter box including: a main body portion and a tray, the main body portion having a urine passing portion through which urine passes; the tray being a portion in which an absorbent body is installed, the absorbent body absorbing the urine that has passed through the urine passing portion, an opening portion for accommodating the tray being provided in a lower end portion of the main body portion on a one side in the front-rear direction, in the lateral direction, a length of the opening portion being greater than a length of the tray, in a state where the tray is accommodated in the main body portion, a bottom portion of the main body portion and a bottom portion of the tray being in contact with a ground plane.

Features of the present invention other than the above will become clear by reading the description of the present specification with reference to the accompanying drawings.

Advantageous Effect of the Invention

According to the present invention, it is possible to provide an animal litter box which is configured with few members and enables a user to easily replace an absorbent sheet even in a small space.

DESCRIPTION OF EMBODIMENTS

Figure 1:
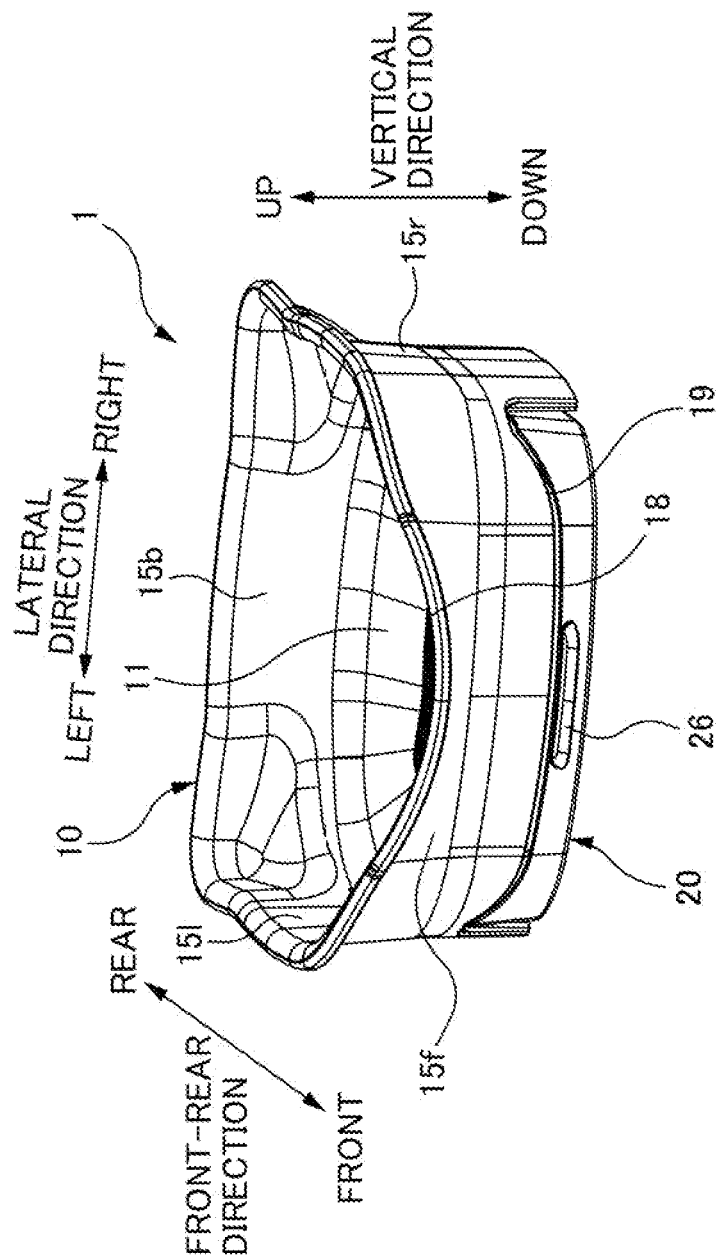
FIG. 1 is a schematic perspective view of an animal litter box 1.

The description of this specification and the accompanying drawings will clarify at least the following matters.

An animal litter box having a front-rear direction, a lateral direction, and a vertical direction intersecting each other, the animal litter box including; a main body portion and a tray, the main body portion having a urine passing portion through which urine passes; the tray being a portion in which an absorbent body is installed, the absorbent body absorbing the urine that has passed through the urine passing portion, an opening portion for accommodating the tray being provided in a lower end portion of the main body portion on a one side in the front-rear direction, in the lateral direction, a length of the opening portion being greater than a length of the tray, in a state where the tray is accommodated in the main body portion, a bottom portion of the main body portion and a bottom portion of the tray being in contact with a ground plane.

According to such an animal litter box, by being composed of two members, namely a main body portion and a tray, it is possible to decrease the overall height of the animal litter box, making it possible to reduce the effort of cleaning or maintenance. Furthermore, because the tray can be moved in or taken out without moving the main body portion, the absorbent body can be easily replaced as long as a space in which the tray can slide in the front-rear direction is ensured. Therefore, even in a small space, the absorbent body can be easily replaced.

There is clarified an animal litter box having a front-rear direction, a lateral direction, and a vertical direction intersecting each other, the animal litter box including: a main body portion and a tray, the main body portion having a urine passing portion through which urine passes; the tray being a portion in which an absorbent body is installed, the absorbent body absorbing the urine that has passed through the urine passing portion, a notch portion being provided in a bottom portion of the main body portion on a rear side in the front-rear direction, the notch portion being obliquely cut so as to have a predetermined angle with respect to a horizontal plane, the main body portion being capable of standing on its own while inclining to the horizontal plane at the predetermined angle, by bringing the notch portion into contact with a ground plane.

According to such an animal litter box, making the main body portion stand one its own in an inclined state enables the front portion of the tray in the front-rear direction to be exposed. Therefore, the user can replace the absorbent body without sliding the tray much in the front-rear direction. Accordingly, even in a small space, it is possible to easily replace the absorbent body and the like.

There is clarified an animal litter box having a front-rear direction, a lateral direction, and a vertical direction intersecting each other, the animal litter box including: a main body portion and a tray, the main body portion having a urine, passing portion through which urine passes; the tray being a portion in which an absorbent body is installed, the absorbent body absorbing the urine that has passed through the urine passing portion, a guide portion being provided on wall portions of the main body portion on two sides in the lateral direction, the guide portion protruding inward from an outer side in the lateral direction, the tray being capable of sliding along the front-rear direction, by bringing the guide portion into contact with two lateral side portions of the tray in a slidable manner.

According to such an animal litter box, even in a small space, there is inhibited the occurrence of troubles, for example, where the tray obliquely slides while being moved in or taken out of the main body portion. Therefore, the tray can be more stably moved in or taken out in the animal litter box consisting of two members, namely the main body portion and the tray.

In such an animal litter box, it is desirable that a length of the tray in the front-rear direction is smaller than the length of the tray in the lateral direction, and that the tray is accommodated in the main body portion by sliding in the front-rear direction.

According to such an animal litter box, the tray slide in the transverse direction (front-rear direction). Therefore, the tray can move a shorter distance compared to a tray sliding along the longitudinal direction (lateral direction). This reduces the space necessary for inserting the tray, making it possible to easily perform replacing of the absorbent body and the like even in a small space.

In such an animal litter box, it is desirable that the tray is symmetrical in the front-rear direction, and that the tray is capable of being accommodated in the main body portion even by being reversed in the front-rear direction.

According to such an animal litter box, it is unnecessary for a user to check the front-rear orientation when accommodating the tray in the main body portion, making less likely to cause the problem of erroneously inserting the tray rearwards. Furthermore, by reversing the tray in the front-rear direction (lateral direction), the user can arrange the absorbent body by turning around it in the front-rear orientation (lateral orientation) without touching the absorbent body. Consequently, the entire region of the absorbent body can be efficiently used, making it possible to replace the absorbent body less often.

In such an animal litter box, it is desirable that the tray has a handle portion on two sides in the front-rear direction.

According to such an animal litter box, when lifting or moving the tray for reversing the orientation of the tray, the user can stably hold the tray by gripping the handle portion on two sides in the front-rear direction.

In such an animal litter box, it is desirable that a notch portion is provided in a lower end portion of the main body portion on another side in the front-rear direction, the notch portion being a portion for accommodating the handle portion.

According to such an animal litter box, it is possible to move the tray into the main body portion without causing interference with the handle portion of the tray and the side-wall portion of the main body portion located on the rear side in the front-rear direction. Accordingly, the side-wall portion and the handle portion can be overlapped and arranged in the front-rear direction, making it possible to reduce the length of the animal litter box in the front-rear direction. Therefore, a more compact space-saving animal litter box can be realized.

In such an animal litter box, it is desirable that in the vertical direction, a position of the urine passing portion is higher than a position of the handle portion.

According to such an animal litter box, the handle portion and the urine passing portion are less likely to come into contact with each other in the vertical direction when the tray slides in the front-rear direction. Therefore, it is possible to inhibit the handle portion from being wet and contaminated with excrement such as urine. It is also possible to inhibit the handle portion from being caught by the main body portion, allowing the user to more smoothly insert the tray.

In such an animal litter box, it is desirable that the tray has a lower surface portion, and that a pair of protruding portions are provided on the lower surface portion, the pair of protruding portions protruding downward in the vertical direction and linearly extending along the front-rear direction.

According to such an animal litter box, the protruding portions decreases the contact area between the lower surface portion of the tray and the floor surface, making it possible to reduce the friction with the floor surface when sliding the tray in the front-rear direction. As a result, the tray slides smoothly, enabling the user to easily insert the tray. Furthermore, the direction of movement of the tray tends to be restricted to the front-rear direction in which the protruding portions extend, making it possible to slide the tray more smoothly.

In such an animal litter box, it is desirable that the tray has a lower surface portion and a side-wall portion, the side-wall portion surrounding four sides of the lower surface portion, the side-wall portion extending along the front-rear direction and the lateral direction, and that four corners of the tray in the lateral direction and the front-rear direction are each provided with an accommodation portion, the accommodation portion being a portion in which at least a part of the absorbent body is accommodated with being tucked.

According to such an animal litter box, a part (corner portion) of the absorbent body is tucked into the accommodation portion so that the absorbent body is fixed in the tray. Therefore, the absorbent foody can be inhibited from being displaced or sticking out of the tray.

In such an animal litter box, it is desirable that the tray has a plate-shaped rib that protrudes upward in the vertical direction from the lower surface portion, that the side-wall portion has a first side-wall portion and a second side-wall portion that intersect each other, and that the accommodation portion is a space surrounded by the first, side-wall portion, the second side-wall portion, and the rib.

According to such an animal litter box, when a part of the absorbent body is tucked into the accommodation portion surrounded by the first side-wall portion, the second side-wall portion, and the rib, the absorbent body becomes easier to be stably held in the tray, by folding the absorbent body at the position of the rib. Accordingly, the user can easily fix the position of the absorbent body and make it difficult for the absorbent body to stick out of the tray.

In such an animal litter box, it is desirable that the rib has a notch at a central part of the rib in a width direction, the notch being formed by cutting out an upper end portion of the rib in the vertical direction.

According to such an animal litter box, in tucking the absorbent body into the accommodation portion, the absorbent body can be folded in different ways in the portion where the notch is formed and in the portion where the notch is not formed. Therefore, the absorbent body is folded in a complicated manner, making it difficult for the absorbent body to be detached from the accommodation portion. This makes it more difficult for the absorbent body to be displaced.

In such an animal litter box, it is desirable that the animal litter box further comprises a ceiling portion that straddles an upper end of the first side-wall portion and an upper end of the second side-wall portion, and that the accommodation portion is a space surrounded by the first side-wall portion, the second side-wall portion, the rib, and the ceiling portion.

According to such an animal litter box, once the absorbent body is tucked into the accommodation portion, the ceiling portion restricts the upward movement of the absorbent body. This makes it easier to inhibit the absorbent body from being detached from the tray. This makes it more difficult for the absorbent body to be displaced.

In such an animal litter box, it is desirable that the tray has a cylindrical through pipe, the through pipe penetrating the lower surface portion and protruding upward in the vertical direction, and that the accommodation portion is an internal space of the through pipe.

According to such an animal litter box, a part of the absorbent body is pushed into the through pipe. This makes it easier to fix the position of the absorbent body, and the displacement of the absorbent body does not easily occur.

In such an animal litter box, it is desirable that a height of two lateral side portions of the tray is higher than a height of a lateral central part of the tray.

According to such an animal litter box, the height of the lateral central part is reduced so that the height of the tray is reduced as much as possible, while the height of two end portions in the lateral direction is increased. This makes it easier to form a wide space (accommodation portion) for fixing the absorbent body. Accordingly, the overall height of the animal litter box can be reduced while inhibiting the displacement of the absorbent sheet arranged in the tray, and the leakage of excrement can be effectively inhibited.

In such an animal litter box, it is desirable that the main body portion has a restriction portion in a side-wall portion on a front side in the front-rear direction, the restriction portion being a portion that restricts movement of the tray in the front-rear direction.

According to such an animal litter box, the front side-wall portion of the tray interferes with the restriction portion, suppressing the tray from moving in the front-rear direction. Accordingly, the tray can be inhibited from being detached from the main body portion due to an erroneous operation or the like after being accommodated in the main body portion.

In such an animal litter box, it is desirable that the animal litter box further comprises a turnover portion in which at least a part of a bottom portion of the main body portion turns over from the one side to another side in either of the front-rear direction and the lateral direction.

According to such an animal litter box, providing the turnover portion increases the area where the bottom portion of the main body portion comes into contact with the floor or the like, making it possible for the animal litter box to be more stably in contact with the ground plane. Furthermore, in the main body portion (side-wall portion), the part provided with the turnover portion exhibits higher bending strength in the lateral direction (or the front-rear direction). Therefore, the main body portion (side-wall portion) can be inhibited from being bent or folded.

First Embodiment

Overall Configuration

Figure 2:
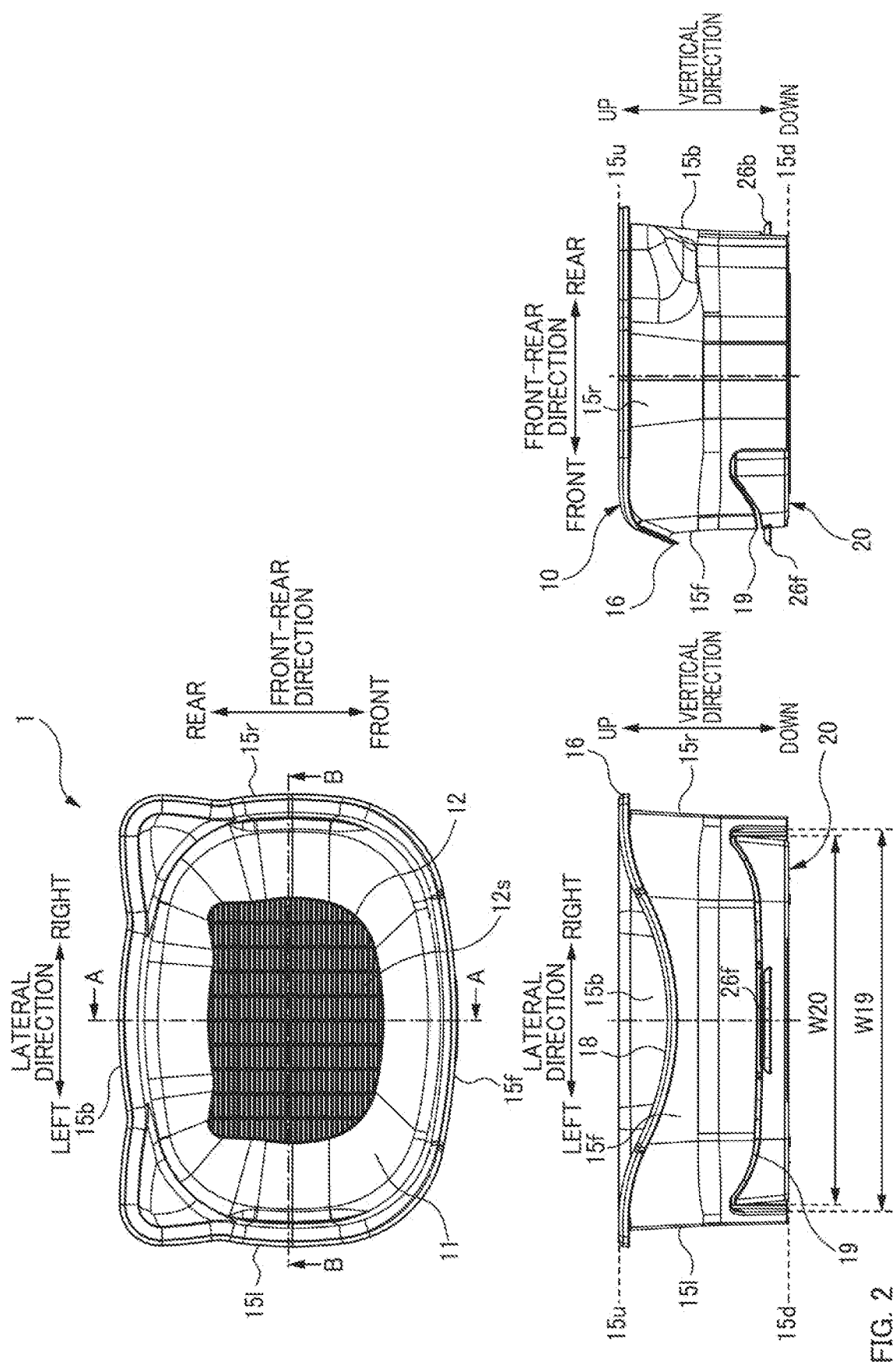
FIG. 2 is plan views of the animal litter box 1 respectively viewed in a vertical direction, a front-rear direction, and a lateral direction.
Figure 3:
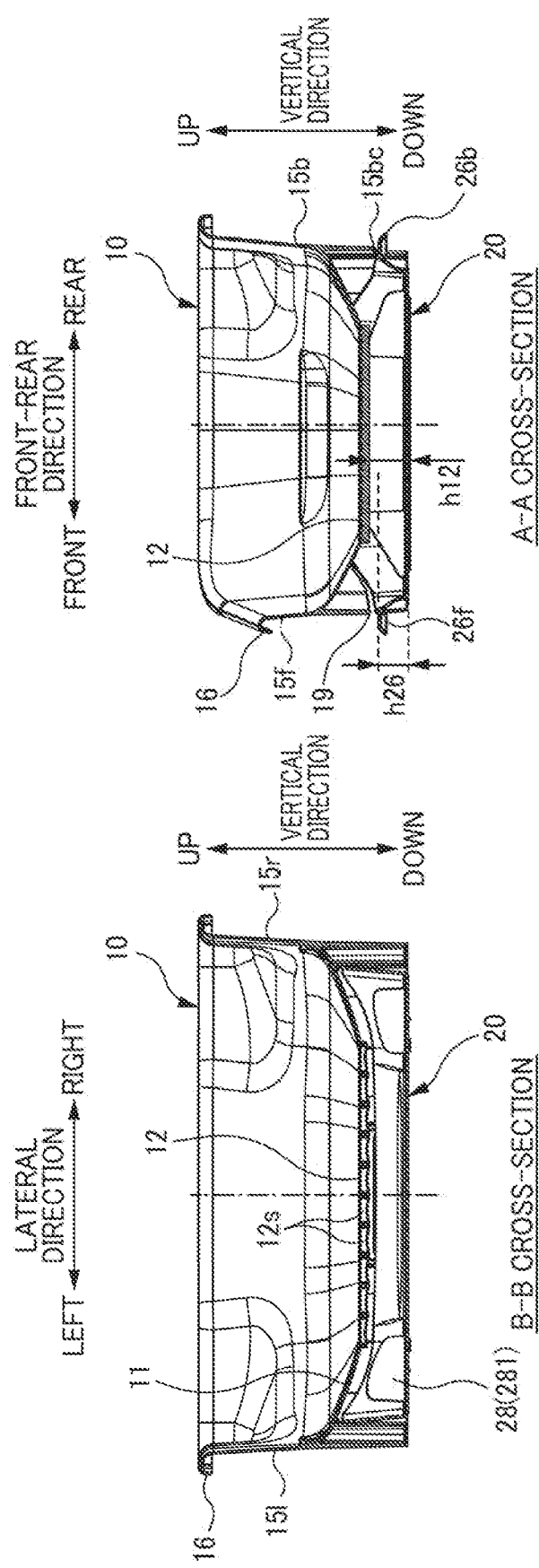
FIG. 3 is cross-sectional views showing the cross sections taken along A-A and B-B in FIG. 2.

As an example of an animal litter box according to a first embodiment, an animal litter box 1 will be described. FIG. 1 is a schematic perspective view of the animal litter box 1. In the description below, three directions, "front-rear direction", "lateral direction", and "vertical direction" that are perpendicular to each other are defined as shown in FIG. 1. In the present embodiment, the front-rear direction means a direction extending in the transverse direction of the animal litter box 1, and a side provided with an entrance for animals (an entrance notch portion 18 to be described later) is defined as front side. The lateral direction is a direction extending along the longitudinal direction of the animal litter box 1. The vertical direction is a direction extending along up-down direction. FIG. 2 is plan views (three side views) of the animal litter box 1 respectively viewed in the vertical direction, the front-rear direction, and the lateral direction. FIG. 3 is cross-sectional views showing the cross sections taken along A-A and B-B in FIG. 2.

The animal litter box 1 includes a main body portion 10 which receives animal excrement, and a tray 20 which is accommodated in the main body portion 10 and in which an absorbent sheet (to be described below) absorbing urine and the like is to be installed.

Main Body Portion 10

The main body portion 10 has a lower surface portion 11 and a side-wall portion 15 that surrounds the lower surface portion 11. The main body portion 10 is a member in the form of an open top box. Animals such as kittens perform excretion in a state of riding on the lower surface portion 11 of the main body portion 10. As shown in FIG. 3, the lower surface portion 11 of the main body portion 10 inclines inward (toward the center) from the outer side in the lateral direction (and the front-rear direction) in a bowl-shaped manner. In the lower surface portion 11, a portion located lowest in the vertical direction is provided with a urine passing portion 12, and through the urine passing portion 12, the urine excreted by an animal passes toward the lower side from the upper side in the vertical direction. The urine passing portion 12 has a plurality of hole portions 12s, which extending through in the vertical direction. The excreted urine passes through the hole portions 12s and moves downward (toward the tray 20) from the upper side of the main body portion 10.

When the animal litter box 1 is to be used, granular excrement treating material such as cat litter (not shown in the drawing) is disposed so as to cover the urine passing portion 12 (lower surface portion 11). An animal such as a kitten performs excretion on the excrement treating material. The excrement treating material used in the animal litter box 1 is a granular substance having a porous structure, such as zeolite or silica gel. This material exhibits an effect of deodorization by absorbing ammonia components upon contact with urine excreted by animals and an effect of adsorbing the odor of ammonia that comes from the sheet. The material also has an effect of moisture removal. In order to suppress the case where granules of the excrement treating material fall through the hole portions 12s of the urine passing portion 12, it is desirable that the hole portions 12s have a shape and size that allows urine to pass but does not allow the excrement treating material to pass. For example, in the animal litter box 1 of the present embodiment, the urine passing portion 12 is formed by forming a plurality of slit-like hole portions 12s that are elongated in the lateral direction as shown in FIG. 2.

The side-wall portion 15 has a front side-wall portion 15f arranged on the front side in the front-rear direction, a rear side-wall portion 15b arranged on the rear side in the front-rear direction, a right side-wall portion 15r arranged on the right side in the lateral direction, and a left side-wall portion 15l arranged on the left side in the lateral direction.

In the side-wall portion 15, an upper end 15u positioned above the lower surface portion 11 in the vertical direction is provided with a folded-back portion 16 that is folded downward in the vertical direction and outward in the front-rear direction (or the lateral direction) (see FIG. 2). By catching the folded-back portion 16 with fingers, the user can easily lift or move the main body portion 10. Furthermore, providing the folded-back portion 16 inhibits the edge of the upper end 15u of the side-wall portion 15 from sharply rising upward. This suppresses the case where an animal such as kitten is hurt on their legs or body by coming into contact with the upper end 15u while entering and exiting the animal litter box 1.

The side-wall portion 15 is in contact with a ground plane (such as a floor or platform) on which the animal litter box 1 is placed, on its lower end 15d positioned below the lower surface portion 11 in the vertical direction. That is, the lower end 15d of the side-wall portion 15 is the lowest portion of the main body portion 10 in the vertical direction. Hereinafter, the lower end 15d of the side-wall portion 15 will be also called "bottom portion" of the main body portion 10.

In the side-wall portion 15, the front side-wall portion 15f is provided with the entrance notch portion 18 formed by cutting out at least a part of the upper end 15u downward in the vertical direction, in the region where the entrance notch portion 18 is provided, the height of the front side-wall portion 15f is lower than the height of the other three side-wall portions 15b, 15l, and 15r in the vertical direction. Therefore, an animal such as a kitten easily enters and exits the animal litter box 1 (main body portion 10) (that is, the region that is above the urine passing portion 12 (lower surface portion 11) and surrounded by the side-wall portion 15) through the entrance notch portion 18 when performing excretion. That is, the entrance notch portion 18 is a portion that functions as an entrance and an exit of the animal litter box 1.

Furthermore, the lower end portion of the front side-wall portion 15f is provided with an opening portion 19 for accommodating the tray 20. The lateral length (opening width) W19 of the opening portion 19 is greater than the maximum value of the lateral length (width) W20 of the tray 20.

Tray 20

Figure 4:
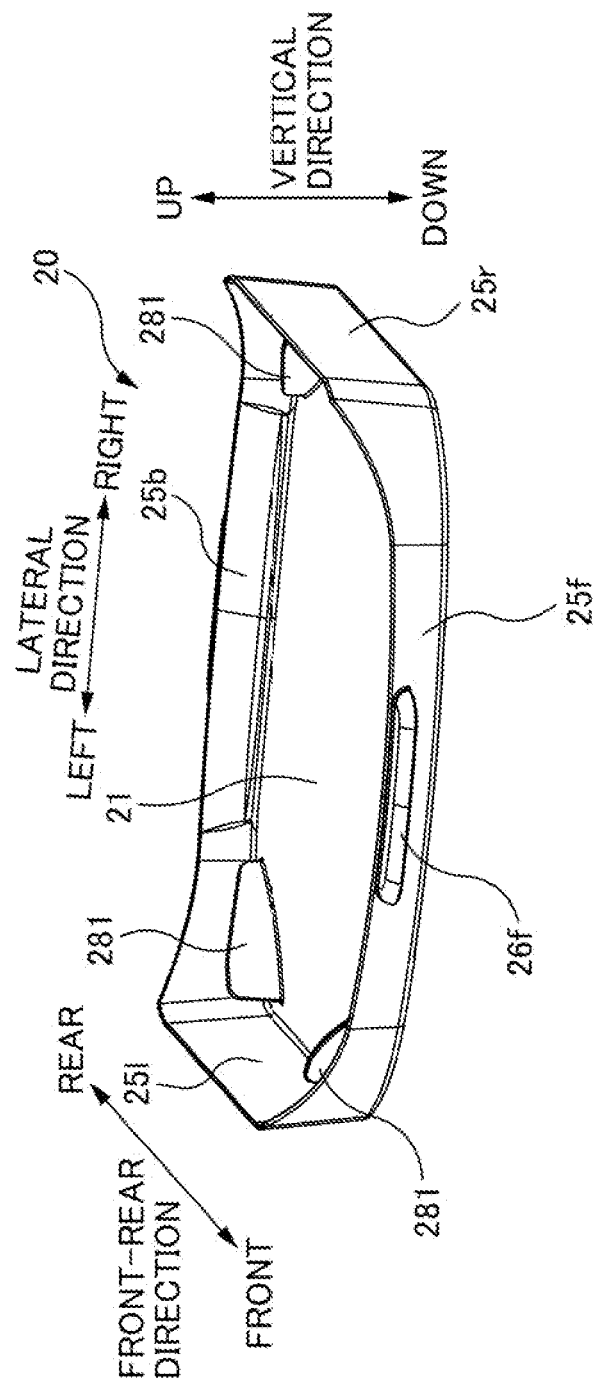
FIG. 4 is a schematic perspective view of a tray 20.
Figure 5:
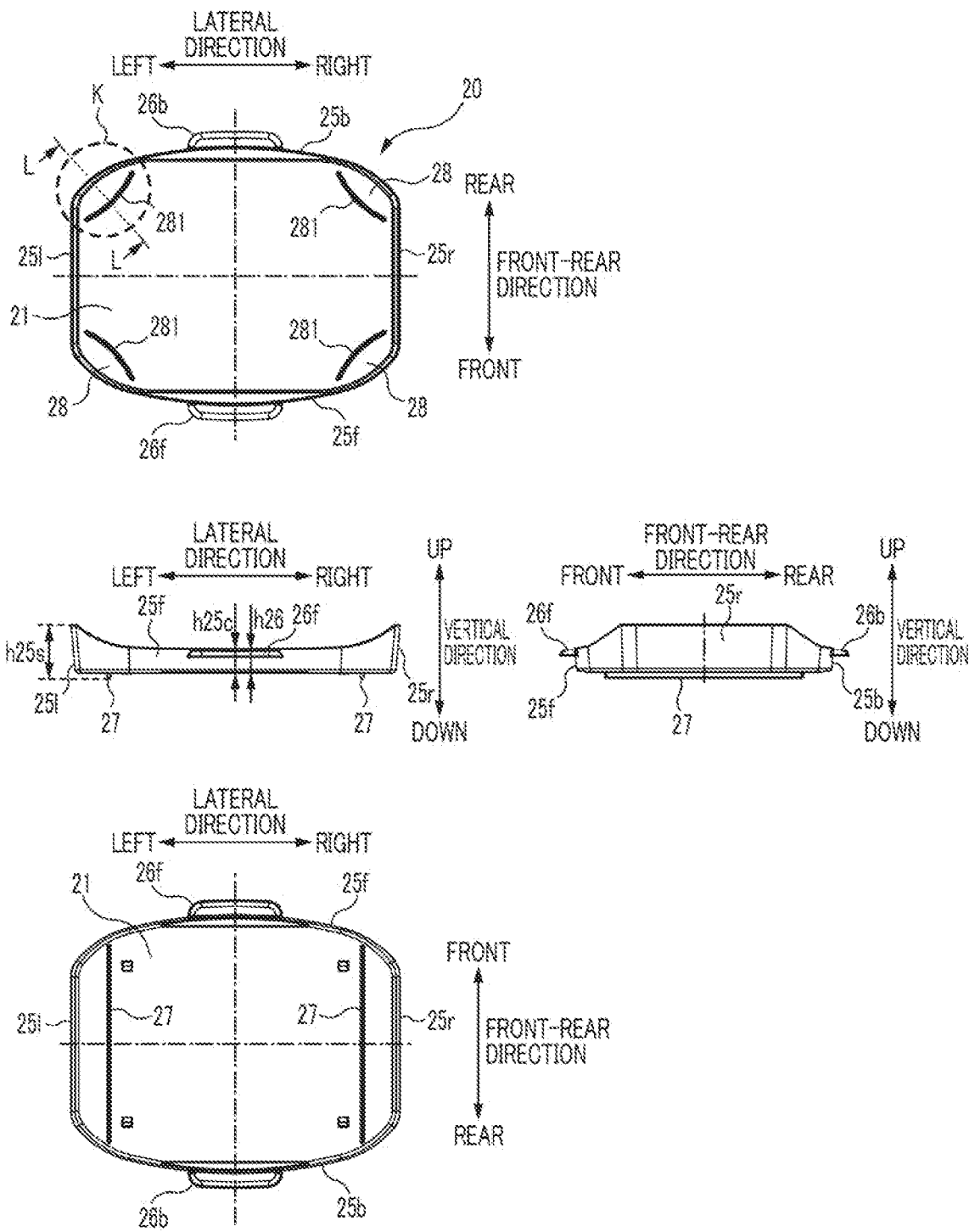
FIG. 5 is plan views of the tray 20 viewed from above and below in the vertical direction and viewed in the front-rear direction and the lateral direction.

FIG. 4 is a schematic perspective view of the tray 20. The "front-rear direction", the "lateral direction", and the "vertical direction" in FIG. 4 are the same directions as the "front-rear direction", the "lateral direction", and the "vertical direction" in FIG. 1 respectively. FIG. 5 is plan views of the tray 20 viewed from above and below in the vertical direction and viewed in the front-rear direction and the lateral direction.

The tray 20 has a lower surface portion 21 and a side-wall portion 25 that surrounds the lower surface portion 21. The tray 20 is a shallow and flat box-shaped container in which an absorbent body (for example, an absorbent sheet 200 to be described later) absorbing excreted urine and the like is installed. The side-wall portion 25 has a front side-wall portion 25f on the front side in the front-rear direction, a rear side-wall portion 25b on the rear side in the front-rear direction, a right side-wall portion 25r on the right side in the lateral direction, and a left side-wall portion 25l on the left side in the lateral direction.

As shown in FIG. 5, the tray 20 of the present embodiment is in the form symmetrical in the front-rear direction. Two end portions of the tray 20 in the front-rear direction, namely the front side-wall portion 25f and the rear side-wall portion 25b, are provided with a front handle portion 26f and a back handle portion 26b respectively. When inserting the tray 20 into the main body portion 10, the user can move or take the tray 20 into or out of the main body portion 10 by gripping the handle portion 26 and sliding the tray 20 in the front-rear direction.

The back surface side (the lower surface in the vertical direction) of the lower surface portion 21 is provided with protruding portions 27 that protrude downward in the vertical direction. As shown in FIG. 5, a pair of protruding portions 27 are formed straight, extending in the front-rear direction and are provided on two sides in the lateral direction. The leading end (the lower end in the vertical direction) of each of the protruding portions 27 is in contact with a plane (for example, a floor or platform) on which the animal litter box 1 is placed. That is, the leading end portions of the protruding portions 27 are the lowest portion of the tray 20 in the vertical direction. Hereinafter, the leading end portions of the protruding portions 27 will be also called "bottom portions" of the tray 20.

Four corners of the tray 20 in the front-rear direction and in the lateral direction are each provided with a sheet accommodation portion 28 for fixing the absorbent sheet 200 to the tray 20. The sheet accommodation portion 28 will be described later.

The absorbent sheet 200 arranged in the tray 20 is a liquid-absorbent sheet member that absorbs urine excreted by an animal such as a cat, and is formed of a liquid-absorbent material such as pulp fibers or a superabsorbent polymer. The followings are also acceptable: an antibacterial agent is provided in the absorbent sheet 200 so as to prevent the growth of the bacteria; and microcapsules are provided in the absorbent sheet 200 so as to gives the sheet fragrance. When the animal litter box 1 is used, the tray 20 in which the absorbent sheet 200 is installed is accommodated in the main body portion 10 through the opening portion IS. As a result, the absorbent sheet 200 is arranged below the urine passing portion 12 in the vertical direction. The excrement excreted by an animal such as a cat in the main body portion 10 moves (falls) down through the urine passing portion 12 and is absorbed by the absorbent sheet 200.

In the present embodiment, the main body portion 10 and the tray 20 are formed of a polyolefin-based thermoplastic resin, such as polyethylene, polypropylene, or polyethylene terephthalate. However, the materials that form the above members are not limited to these. For example, other resins, wood, metal materials, such as a stainless steel plate and an aluminum plate, or other members may also be used.

Replacing Absorbent Sheet 200

As described above, when the animal litter box 1 is used, the tray 20 in which the absorbent sheet 200 is arranged is accommodated in the main body portion 10. When the absorbent sheet 200 needs to be replaced, the tray 20 is taken out or moved in, through the opening portion 19 that is provided in the main body portion 10.

The animal litter box 1 of the present embodiment is configured with two members, the main body portion 10 and the tray 20. Therefore, the overall height of the animal litter box 1 is unlikely to be higher than the height of the conventional animal litter box configured with three or more members. Furthermore, in a state where the animal litter box 1 is placed on a horizontal plane such as a floor or platform, each of the bottom portion (lower end 15*d*) of the main body portion 10 and the bottom portion (protruding portions 27) of the tray 20 is in contact with the surface of the horizontal plane. That is, the main body portion 10 is not provided with a portion for accommodating the bottom portion of the tray 20. For example, in Patent Literature 1, in a state where the tray is accommodated in the outer container, the bottom portion of the outer container is arranged below the bottom portion of the tray. However, in the animal litter box 1, the main body portion is not arranged below the bottom portion of the tray 20. Therefore, the height of the main body portion 10 can be reduced, making it possible to reduce the overall height of the animal litter box 1. As a result, even short-legged animals, such as kittens, can easily enter and exit the animal litter box 1.

When the absorbent sheet 200 needs to be replaced, by sliding the tray 20 on the main body portion 10 in the front-rear direction, the user can move in or take out the tray 20 in a simple manner. In the present embodiment, the maximum value of a length W20 of the tray 20 in the lateral direction is smaller than a length W19 of the opening portion 19 in the lateral direction. Therefore, when the tray 20 is slid in the front-rear direction so as to be accommodated in the main body portion 10, the side-wall portion 25 on two lateral sides of the tray 20 is less likely to interfere with the opening portion 19 of the main body portion 10. That is, because the tray 20 is less likely to be caught by the opening portion 19, the tray 20 can be smoothly moved in or taken out of the main body portion 10.

Most of the conventional animal litter boxes are configured with three or more members (for example, an upper container, a lower container, and a tray). Therefore, the animal litter boxes tend to be tall, and cleaning or maintenance thereof requires much work. In addition, the overall sizes of the animal litter boxes tend to be large because they include many members, and it is difficult to place the animal litter boxes in a cage if keeping and caring a kitten or the like in the cage. Moreover, it is difficult to replace the absorbent sheet in a small space such as the inside of a cage, and the user needs to take the entire animal litter box out of the cage to replace the absorbent sheet and then put the entire animal litter box back into the cage. In this way, the conventional animal litter box forces the user to work much and is not suitable for keeping and caring an animal in a cage.

In contrast, because the animal litter box 1 of the present embodiment is configured with two members, the overall height of the animal litter box 1 can decrease, making it possible to reduce efforts of cleaning or maintenance. Furthermore, in replacing the absorbent sheet 200, the user can move in or take out the tray 20 without moving the main body portion 10. That is, the user can easily replace the absorbent sheet 200 as long as enough space for the tray 20 to slide back and forth is ensured. Therefore, the animal litter box 1 makes it easy to perform replacing of the absorbent sheet 200, cleaning, and the like in a small space, and is suitable for the case of keeping kittens or the like in a cage.

Furthermore, in the animal litter box 1 of the present embodiment, as shown in FIGS. 2 and 5, the lengths of the main body portion 10 and the tray 20 in the lateral direction is greater than the lengths thereof in the front-rear direction. Therefore, when moved in or taken out of the main body portion 10, the tray 20 is slid along the transverse direction (front-rear direction), which enables the tray 20 to move a shorter distance compared to a tray sliding along the longitudinal direction (lateral direction). This reduces the space necessary for moving in and taking out the tray 20, making it easier to move in or take out the tray 20 and to perform replacing of the absorbent sheet 200 and the like even in a small space such as the inside of the cage.

Furthermore, the tray 20 is symmetrical in the front-rear direction, and can be accommodated in the main body portion 10 even by being reversed in the front-rear direction. That is, the user does not need to check the front-rear orientation when inserting the tray 20 into the main body portion 10, making less likely to cause the problem of erroneously inserting the tray rearwards. Therefore, the user can insert the tray 20 into the main body portion 10 without caring about the front-rear orientation of the tray 20 (without caring about the orientation of the tray in the front-rear direction), making it possible for the user to insert the tray 20 without any stress.

Furthermore, because the tray 20 can be used with the front and rear being reversed, it is easy to efficiently use the absorbent sheet 200. Generally, an animal such as a cat has a habit of performing excretion at the same position in an animal litter box every time when the animal performs excretion in the litter box. For example, in the case where a cat has a habit of performing excretion in the right region in the lateral direction, urine and the like are absorbed mainly into the right region of the absorbent sheet 200. Therefore, only the right region of the absorbent sheet 200 tends to soon reach the absorption limit. In this case, by reversing the arrangement of the absorbent sheet 200 in the lateral direction so that the region having been arranged on the left side is arranged on the right side, the entire region of the absorbent sheet 200 can be evenly used.

Specifically, after being pulled out from the main body portion 10, the tray 20 in which the absorbent sheet 200 is arranged is turned around in the front-rear direction (that is, the lateral direction) and then accommodated again in the main body portion 10 as it is. This method enables the user to change the orientation of the absorbent sheet 200 (tray 20) without touching the absorbent sheet 200, making it possible to efficiently use the absorbent sheet 200, and to replace the absorbent sheet 200 less often. Generally, the absorbent sheet used in an animal litter box is continuously used for one or more weeks. Reducing the frequency of replacing the absorbent, sheet 20G simply by switching the orientation of the absorbent sheet 200 can further reduce the burden on the user.

In the present embodiment, handle portions 26f and 26b are provided on two sides of the tray 20 in the front-rear direction. Therefore, when reversing the tray 20 in the front-rear direction, the user can move in or take out the tray 20 by gripping any of the handle portions 26f and 26b provided at front and rear. This still makes it easy to handle the tray even in a small space such as the inside of a cage. Furthermore, in the case where the user needs to lift or move the tray 20, the user can stably hold the tray 20 by gripping the handle portions 26f and 26b on two front-rear-direction sides with his/her hands.

The rear side-wall portion 15fc of the main body portion 10 is provided with a rear notch portion 15bc at the central part in the lateral direction, and in the rear notch portion, there is cut out a region having a predetermined height from the lower end in the vertical direction (see FIG. 3). The rear notch portion 15bc is provided for the following purpose: in a state where the tray 20 is accommodated in the main body portion 10, it is to inhibit interference with the handle portion 26 provided on the rear side of the tray 20 and the rear side-wall portion 15b of the main body portion 10. In other words, the rear notch portion 15bc is provided for accommodating the handle portion 26 of the tray 20.

In the case where the rear notch portion 15bc is not provided in the rear sidewall portion 15b, when the tray 20 is to be accommodated in the main body portion 10, the handle portion 26 on the rear side is caught by the rear side-wall portion 15b, and the tray 20 cannot be inserted deep into the far side (rear side in the front-rear direction) of the main body portion 10. Alternatively, the length of the main body portion 10 in the front-rear direction increases, and the shape of the animal litter box is not suitable for use in a small space such as a cage. In contrast, in the present embodiment, as shown in the cross-sectional view taken along A-A in FIG. 3, the rear notch portion 15bc is provided. Therefore, the tray 20 can be inserted deep into the far side of the main body portion 10 in the front-rear direction without allowing the handle portion 26 to interfere with the rear side-wall portion 15b. Accordingly, the rear side-wall portion 15b and the handle portion 26 can be arranged at positions that overlap in the front-rear direction, making it possible to reduce the length of the animal litter box 1 (main body portion 10) in the front-rear direction. As a result, a compact and space-saving animal litter box 1 can be realized.

Furthermore, the tray 20 is in contact with the ground plane through the protruding portions 27 provided on the back surface side of the lower surface portion 21. As shown in FIG. 5, the protruding portions 27 are formed straight, extending along the front-rear direction. The protruding portions 27 have a small width in the lateral direction and have a small contact area with the floor surface or the like. Therefore, in the case where the tray 20 is slid in the front-rear direction, it is possible to reduce the friction between the protruding portions 27 and the floor surface. Accordingly, the tray 20 smoothly slides in the front-rear direction, enabling the user to move and take the tray 20 into and out of the main body portion 10 with less force. Furthermore, because the protruding portions 27 function like the blades of skating shoes, the direction of movement of the tray 20 tends to be restricted to the direction in which the protruding portions 27 extend. That is, the tray 20 easily moves in the front-rear direction, making it easier to slide the tray 20 more smoothly. Here, the protruding portions 27 are not an essential constituent of the tray 20, and the protruding portions 27 does not have to be provided on the lower surface portion 21.

As for the absorbent sheet 200 used in the animal litter box 1 by being arranged on the inside of the tray 20, the sheet 20G in most cases has a slightly larger area than the lower surface portion 21 of the tray 20 in order to inhibit the leakage of excrement. In the case where the absorbent sheet 200 having a larger area than the lower surface portion 21 is used, securely fixing the absorbent sheet 200 to the inside of the tray 20 is required in order to prevent the absorbent sheet 200 from being displaced in the tray 20 or sticking out of the tray 20. In the present embodiment, in four corners of the tray 20 in the front-rear direction and the lateral direction (right front side, left front side, right rear side, and left rear side), there are provided the sheet accommodation portions 28 for accommodating corner portions of the rectangular absorbent sheet 200 so as to fix the absorbent sheet 200 to the inside of the tray 20.

Figure 6A:
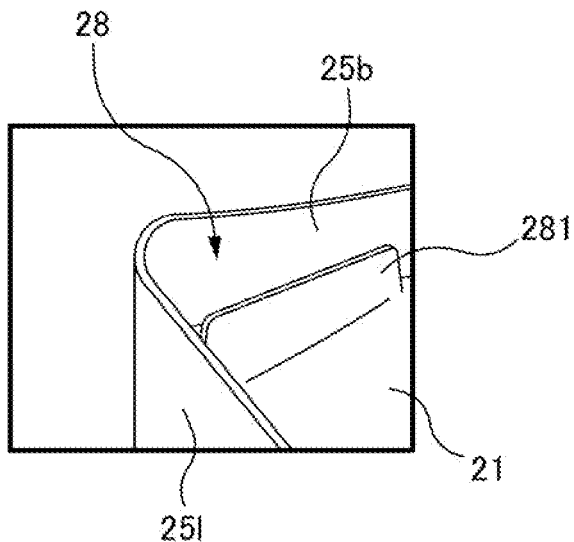
FIG. 6 is diagrams illustrating a sheet accommodation portion 28.
Figure 6B:
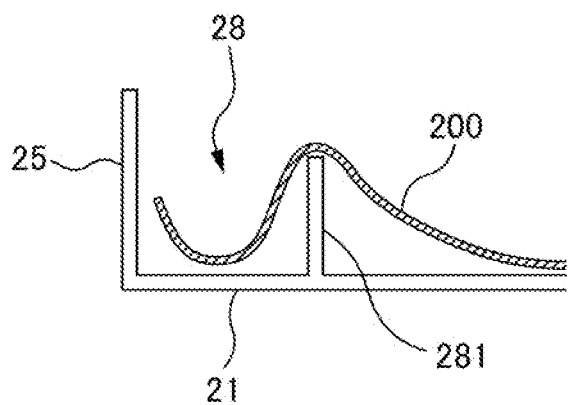

FIG. 6 is diagrams illustrating the sheet accommodation portion 28. FIG. 6A is a perspective view of a part of a region K (left back corner) in FIG. 5. FIG. 6B is a schematic cross-sectional view taken along L-L in FIG. 5. In the example shown in FIG. 6A, the sheet accommodation portion 28 is formed of a space surrounded by the followings: a plate-shaped rib 281 that, protrudes upward from the lower surface portion 21 of the tray 20; the rear side-wall portion 25b (corresponding to "first side-wall portion") and the left side-wall portion 25l (corresponding to "second side-wall portion") that intersect with each other among the side-wall portions 25 of the tray 20; and a lower surface 21.

When the absorbent sheet 200 is installed in the tray 20, as shown in FIG. 6B, a left back corner portion of the absorbent sheet 200 is tucked into the sheet accommodation portion 23. Similarly, for the other three corners (the left front side, the right rear side, and the right front side), the corner portions of the absorbent sheet 200 are tucked into the sheet accommodation portion 28, which is a space surrounded by the rib 281 and the side-wall portions 25 (the first side-wall portion and the second side-wall portion). At this time, the absorbent sheet 200 is folded at the position of the rib 281 that protrudes upward in the vertical direction, making it easier for the absorbent sheet 200 to be stably held in the tray. In this way, the user can arrange the absorbent sheet 200 so as to prevent the absorbent sheet 200 from sticking out of the tray 20 while fixing the position of the absorbent sheet 200. The rib 281 may be in contact with or apart from the side-wall portion 25, That is, the rib 281 may be formed as a member integrated with or independent from the side-wall portion 25.

Figure 7A:
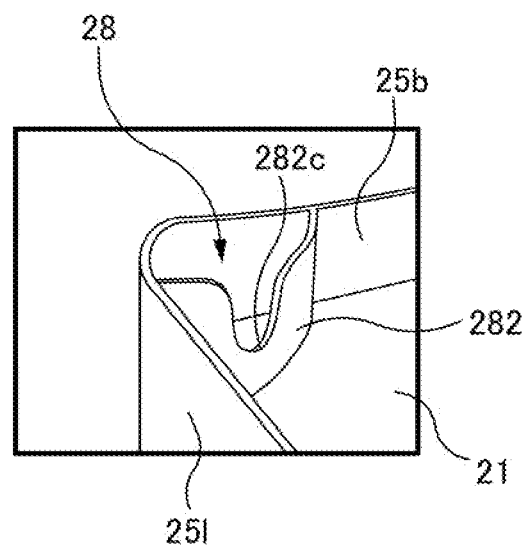
FIG. 7 is a diagram illustrating a first modified example of the sheet accommodation portion 28.
Figure 7B:
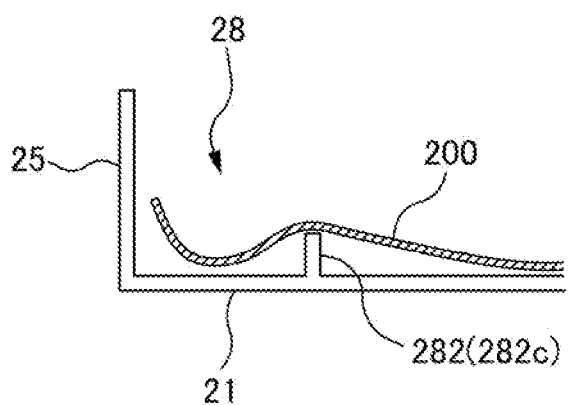

FIG. 7 is a diagram illustrating a first modified example of the sheet accommodation portion 28. FIGS. 7A and 7B correspond to FIGS. 6A and 6B respectively. In the first modified example, the sheet accommodation portion 28 has a plate-shaped rib 282 that protrudes upward from the lower surface portion 21 of the tray 20, and there is further provided a notch 282c that is at the central part of the rib 282 in the width direction and formed by cutting out the upper end portion of the rib 282 in a V shape, in the vertical direction as shown in FIG. 7A. Other configurations are substantially the same as those of the sheet accommodation portion 28 described in FIG. 6. That is, the sheet accommodation portion 28 is formed of a space surrounded by the rib 282, the rear side-wall portion 25b, and the left side-wall portion 25l. The rib 282 may be in contact with or apart from the side-wall portion 25.

In a first modified example, when tucking into the sheet accommodation portion 28, the absorbent sheet 200 is folded in different ways in a portion where the notch 282c is formed and in a portion where the notch 282c is not formed. Specifically, in the portion where the notch 282c is provided, the absorbent sheet 200 is folded less as in FIG. 7B, and in a portion where the notch 282c is not provided, the absorbent sheet 200 is folded much as in FIG. 6B. As a result, the absorbent sheet 200 is folded in a complicated manner, making it difficult for the absorbent sheet 200 to be detached from the sheet accommodation portion 28, which is a space surrounded by the rib 282 and the side-wall portion 25. That is, this makes it easier to fix the absorbent sheet 200, and makes it more difficult for the absorbent sheet 200 to be displaced.

Figure 8A:
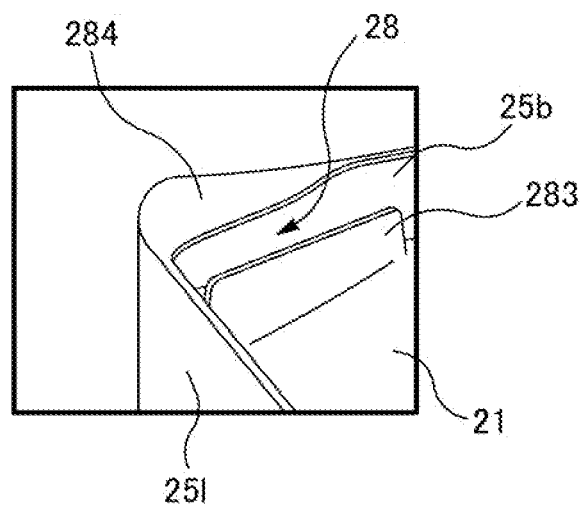
FIG. 8 is a diagram illustrating a second modified example of the sheet accommodation portion 28.
Figure 8B:
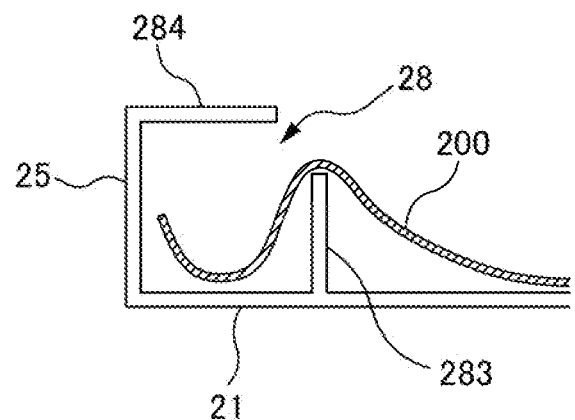

FIG. 8 is a diagram illustrating a second modified example of the sheet accommodation portion 28. FIGS. 8A and 8B correspond to FIGS. 6A and 6B respectively. In the second modified example, the sheet accommodation portion 28 is provided with a plate-shaped rib 283 that protrudes upward from the lower surface portion 21 of the tray 20 as illustrated in FIG. 6, and there is further provided a ceiling portion 284 that covers a part of the space surrounded by the rib 283 and the side-wall portion 25. In the example shown in FIG. 8A, the ceiling portion 284 is arranged straddling the upper end of the rear side-wall portion 25b (first side-wall portion) and the upper end of the left side-wall portion 25l (second side-wall portion) of the tray 20. The space surrounded by the rib 283, the side-wall portion 25, and the ceiling portion 284 serves as the sheet accommodation portion 28. The ribs 283 may be in contact with or apart from the side-wall portion 25. Furthermore, only the ceiling portion 284 may be provided without the rib 283.

Once the absorbent sheet 200 is tucked into the sheet accommodation portion 28 which is a space described above, the ceiling portion 284 restricts the upward movement of the absorbent sheet 200, making it easier to inhibit the absorbent sheet 200 from being detached from the tray 20. Accordingly, this makes it easier to fix the absorbent sheet 200, and makes it more difficult for the absorbent sheet 200 to be displaced.

Figure 9A:
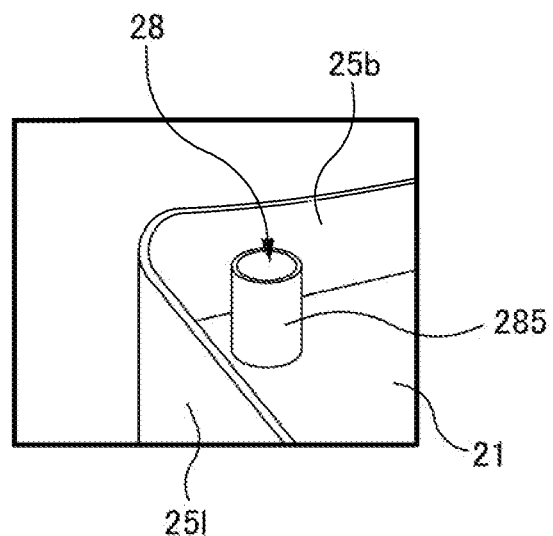
FIG. 9 is a diagram illustrating a third modified example of the sheet accommodation portion 28.
Figure 9B:
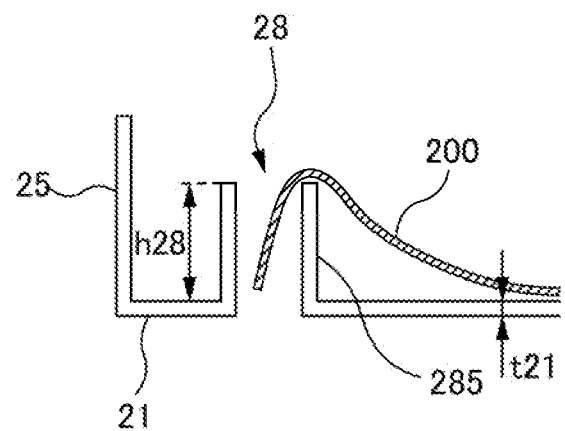

FIG. 9 is a diagram, illustrating a third modified example of the sheet accommodation portion 28. FIGS. 9A and 9B correspond to FIGS. 6A and 6B respectively. In the third modified example, as shown in FIG. 9A, there is provided a cylindrical through pipe 285 that penetrates the lower surface portion 21 of the tray 20 and protrudes upward in the vertical direction. The sheet accommodation portion 28 is formed in the through pipe 285. In the third modified example, the projection height h285 of the sheet accommodation portion 28 (through pipe 285) is set to be greater than at least the thickness of the tray 20 (for example, a thickness t21 of the lower surface portion 21).

In the third modified example, when the absorbent sheet 200 is installed in the tray 20, corner portions of the absorbent sheet 200 are pushed into the through pipe 285, as shown in FIG. 9B. This makes it easier to fix the position of the absorbent sheet 200, and the occurrence of displacement can be further inhibited. By setting the projection height h285 of the through pipBye 285 to be greater than a thickness t21 of the tray 20, it is possible to inhibit the absorbent sheet 200 from escaping from the inside of the through pipe 285 and sticking out of the side below the through pipe 285 (side of the tray 20 below the lower surface portion 21).

It is desirable that in the lateral direction (the longitudinal direction of the tray 20), the height of two side portions of the tray 20 is higher than the height of the central part of the tray 20. In FIG. 5, when the tray 20 is viewed in the front-rear direction, the height h25s of two lateral end portions is greater than a height h25c of the lateral central part (h25s>h25c). Because the animal litter box 1 is supposed to be used by kittens or small animals, the overall height thereof needs to be as small as possible. Therefore, it is desirable that the height of the tray 20 is as small as possible. Accordingly, the height h25c of the central part in the lateral direction is reduced. On the other hand, at two lateral end portions of the tray 20, the absorbent sheet 200 is required to be fixed by providing the sheet accommodation portion 28 as described above. Therefore, in order that a space having a certain size can be formed, the height h25s is made greater than the height h25c. This makes it possible to reduce the overall height of the animal litter box 1, to inhibit the displacement of the absorbent sheet 200 arranged in the tray 20, and to effectively inhibit the leakage of excrement.

In the present embodiment, on the inside of the tray 20, the height of two lateral end portions is also greater than the height of the lateral central part. That is, because two lateral end portions of the tray 20 are provided with components such as the rib 281 protruding upward from the lower surface portion 21, the height of the two end portions is greater than the height of the lower surface portion 21. Accordingly, in the case where the absorbent sheet 200 is arranged in the tray 20, the height of the absorbent sheet 200 at the two lateral end portions is greater than the height of the absorbent sheet 200 at the lateral central part. This makes it easier for urine and the like, absorbed into the absorbent sheet 200 to move to the central part from the two end portions in the lateral direction, making it easier to inhibit the urine and the like from leaking out of the tray 20.

In a state where the tray 20 is accommodated in the main foody portion 10, the lowest position of the lower surface portion 11 of the main body portion 10 in the vertical direction is above the highest position of the handle portion 26 of the tray 20 in the vertical direction. That is, in the vertical direction, the height of the urine passing portion 12 is higher than the height of the handle portion 26. In the cross-sectional view in FIG. 3 taken along A-A, the height h12 of the urine passing portion 12 in the vertical direction is higher than the height h26 of the handle portion 26 in the vertical direction (height h12>height h26).

According to the above configuration, when the tray 20 is slid in the front-rear direction, the handle portion 26 and the urine passing portion 12 (main body portion 10) are less likely to come into contact with each other in the vertical direction. Accordingly, it is possible to inhibit the handle portion 26 from being wet and contaminated with excrement, such as urine, when the tray 20 is accommodated. Furthermore, the handle portion 26 can be inhibited from being caught by the urine passing portion 12 (main body portion 10) when the tray 20 is slid. Therefore, the tray 20 can be smoothly inserted. In the present embodiment, the height h26 of the handle portion 26 is substantially the same as a height h25c of the central part of the tray 20 in the lateral direction (see FIG. 5). Therefore, in the animal litter box 1, the side-wall portions 25f and 25b of the tray 20 are less likely to come into contact with the urine passing portion 12 when the tray 20 is inserted. That is, the entire tray 20 is less likely to come into contact with the urine passing portion 12.

Figure 10:
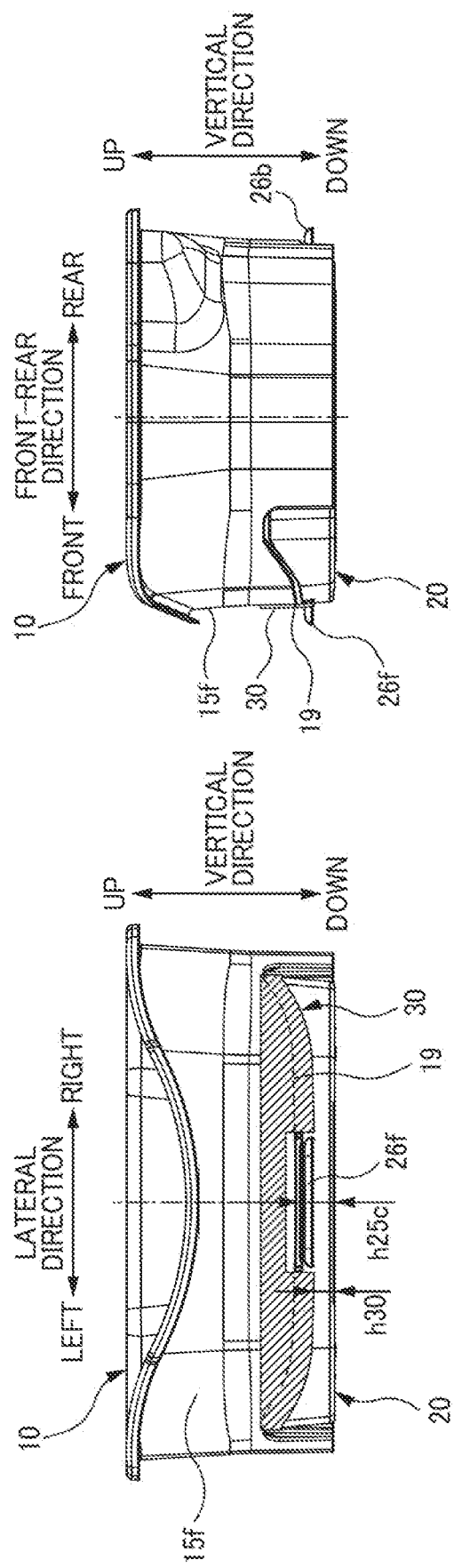
FIG. 10 is a diagram illustrating an example of a slide restriction portion 30.

Furthermore, in order to inhibit the tray 20 having been accommodated in the main body portion 10 from being detached from the main body portion 10 due to an erroneous operation or the like, a slide restriction portion 30 for restricting the movement of the tray 20 in the front-rear direction may be provided in the front side-wall portion 15f of the main body portion 10. FIG. 10 is a diagram illustrating an example of a slide restriction portion 30. In the example shown in FIG. 10, a plate-shaped slide restriction portion 30 (indicated by the hatched portion in FIG. 10) is provided along the edge part of the opening portion 19 of the front side-wall portion 15f. In at least, a part of the region, the height h30 of the slide restriction portion 30 is smaller than the height h25c of the tray 20 at the central part in the lateral direction. That is, the slide restriction portion 30 is provided so as to overlap at least a part of the tray 20 (front side-wall portion 25f) in the vertical direction. In FIG. 10, the slide restriction portion 30 is provided as a member separated from the front side-wall portion 15f. However, the slide restriction portion 30 and the front side-wall portion 15f may be provided as an identical member. That is, a part of the front side-wall portion 15f may configure the slide restriction portion 30.

According to the above configuration, when sliding the tray 20 in the front-rear direction, the front side-wall portion 25f of the tray 20 interferes with the slide restriction portion 30, suppressing the movement of the tray 20 in the front-rear direction. Accordingly, the tray 20 accommodated in the main body portion 10 can be inhibited from being detached from the main body portion 10 due to an erroneous operation or the like. In the case where the slide restriction portion 30 is provided in the main body portion 10, it is preferable that, when inserting the tray 20, the user slightly lifts up the front side of the main body portion 10 so that the tray 20 and the slide restriction portion 30 do not interfere with each other, and then slide the tray 20.

Figure 11:
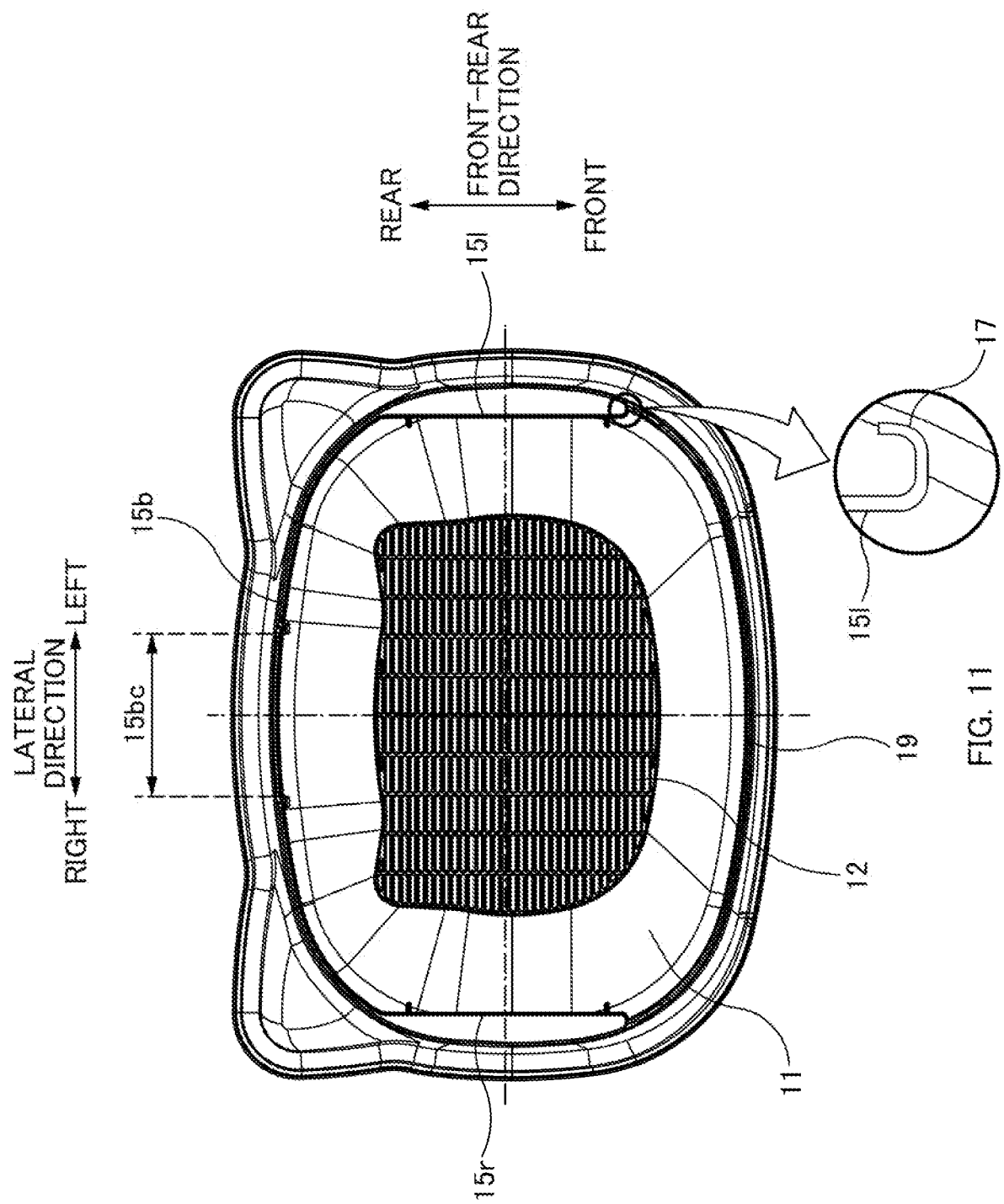
FIG. 11 is a plan view of a main body portion 10 viewed from below in the vertical direction.

In the main body portion 10, a turnover portion 17 is provided in which the lower end 15d of the side-wall portion 15 (that is, the bottom portion of the main body portion 10) turns over from one side to the other side in the front-rear direction or from one side to the other side in the lateral direction. FIG. 1I is a plan view of the main body portion 10 viewed from below in the vertical direction. As shown in FIG. 11 which is a partially enlarged view, in the present embodiment, the front end portions of the left and right side-wall portions 15l and 15r are provided with the turnover portions 17 in which bottom portions of the side-wall portions 15l and 15r turn over to the rear side from the front side in the front-rear direction. Providing the turnover portion 17 increases the area where the bottom portions of the side-wall portions 15l and 15r laterally come into contact with a plane (such as a floor). As a result the side-wall portions 15l and 15r more stably come into contact with the ground plane. Furthermore, in the portions where the turnover portions 17 are provided, side-wall portions 15l and 15r exhibit higher bending strength in the lateral direction, making it possible to inhibit the side-wall portions 15l and 15r from being bent or folded.

FIG. 11 illustrates an example in which the turnover portion 17 is provided at the front end portions of the left and right side-wall portions 15l and 15r. The turnover portion 17 may be provided at other portions of the side-wall portion 15. For example, in the boundary portion with the rear notch portion 15bc in the rear side-wall portion 15b, a part of the rear side-wall portion 15b may turn over from one side to the other side in the lateral direction so that the turnover portion 17 is formed.

Second Embodiment

In a second embodiment, the animal litter box 2 will be described in which a part of the side-wall portion 15 is cut out at the rear end portion of the main body portion 10 in the front-rear direction and at the lower end portion of the main body portion 10 in the vertical direction.

Figure 12A:
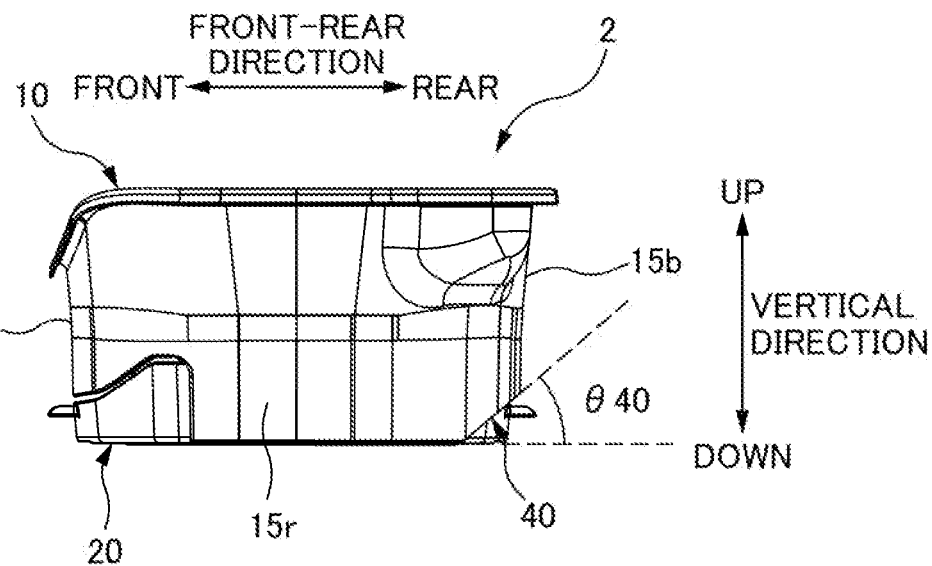
FIGS. 12A and 12B are diagrams of an animal litter box 2 when viewed in the lateral direction.
Figure 12B:
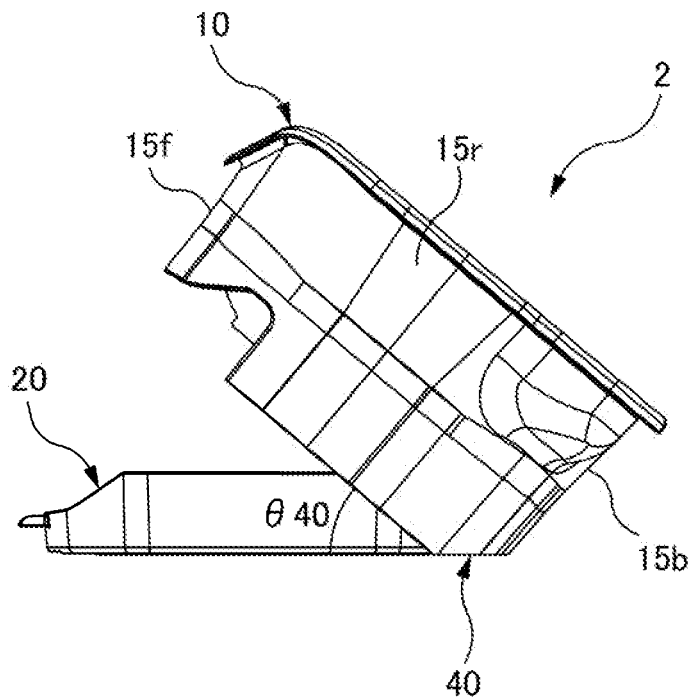

FIGS. 12A and 12B are views diagrams of the animal litter box 2 viewed in the lateral direction. The animal litter box 2 has a notch portion 40 in which the bottom portion of the main body portion 10 is obliquely cut out so that the notch portion 40 has a predetermined angle with respect to a horizontal plane such as a floor. The configuration of the animal litter box 2 is substantially the same as the configuration of the animal litter box 1 of the first embodiment, except for the notch portion 40 formed in the main body portion 10. Therefore, the description of other constituents of the animal litter box 2 will be omitted.

As shown in FIG. 12A, the animal litter box 2 has the notch portion 40 in the side-wall portion 15 of the main body portion 10 (the left and right side-wall portions 15l and 15r and the rear side-wall portion 15b), the notch portion 40 being formed by cutting out the rear end portion of in the front-rear direction and the lower end portion in the vertical direction, at a predetermined angle θ40 to the horizontal plane. The angle which the notch portion 40 forms with the horizontal plane refers to a smaller one (that is, an angle smaller than 90 degrees) among angles formed by the intersection of the horizontal direction and the direction in which the notch portion 40 inclines.

As shown in FIG. 12B, in the case where the notch portion 40 is brought into contact with the ground plane, the main body portion 10 of the animal litter box 2 can obliquely stand on its own. Specifically, the main body portion 10 can stand on its own in a state where its front-rear direction is inclined at the angle θ40 to the horizontal plane. In the case where such an animal litter box 2 is used, even though a cage is used for keeping animals, such as kittens, it is possible to reduce the distance that the tray 20 slides at the time of an operation in the cage such as replacement of the absorbent sheet 200. For example, in the case where the main body portion 10 stands on its own made obliquely as shown in FIG. 12B (a direction in which the main body portion is turned clockwise in FIG. 12B), the front portion of the tray 20 in the front-rear direction is exposed. This makes it easier for the user to replace the absorbent sheet 200 without sliding much the tray 20 in the front-rear direction. Accordingly, even in a small space such as the inside of a cage, it is possible to easily replace the absorbent sheet 200 or the like.

Third Embodiment

In a third embodiment, the animal litter box 3 will be described in which a guide portion 50 that guides the tray 20 sliding in the front-rear direction is provided at the lower end portions of the side-wall portions 15r and 15l on two sides of the main body portion 10 in the lateral direction.

Figure 13:
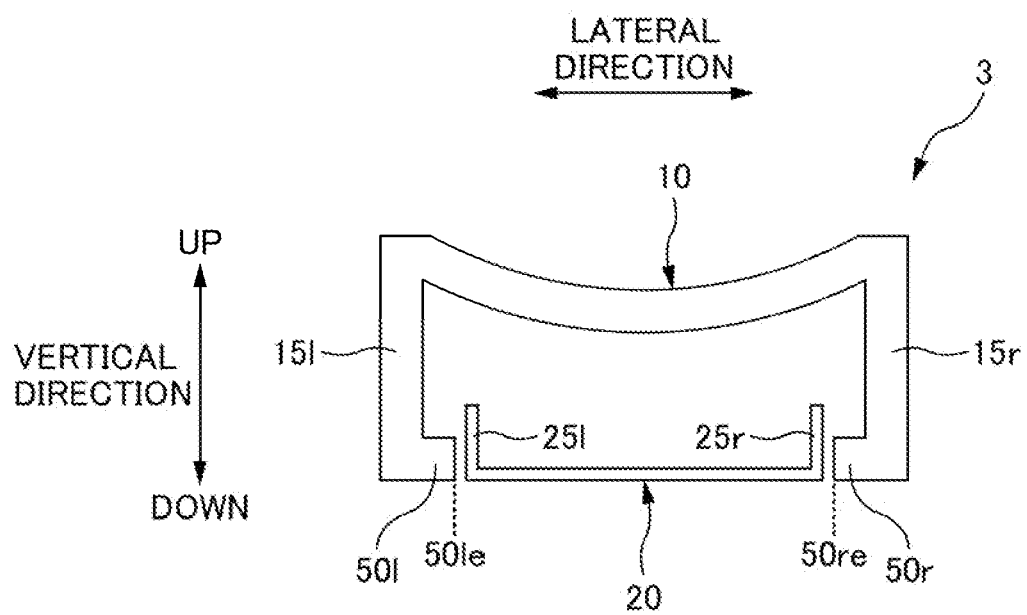
FIG. 13 is a schematic cross-sectional view of an animal litter box 3 viewed from front in the front-rear direction.

FIG. 13 is a schematic cross-sectional view of the animal litter box 3 viewed from front in the front-rear direction. In the animal litter box 3, a pair of guide portions 50r and 50l that protrude inward from the outer side in the lateral direction are provided at the lower end portions of the side-wall portions 15r and 15l. The inner ends 50re and 50le of the guide portion 50 in the lateral direction linearly extend along the front-rear direction. When the tray 20 is accommodated in the main body portion 10, the inner ends 50re and 50le slidably come into contact with the outer surface of side-wall portions 25r and 25l on two lateral sides of the tray 20 (in FIG. 13, for the convenience of description, the inner ends 50re and 50le are not in contact with the side-wall portions 25r and 25l).

Therefore, when the tray 20 is accommodated in the main body portion 10, the side-wall portions 25r and 25l of the tray 20 are sandwiched between the inner ends 50re and 50le of the pair of guide portions 50r and 50l, making it possible for the tray 20 to slide in the front-rear direction under the guidance of the inner ends 50re and 50le. That is, when the tray 20 is moved in or taken out of main body portion 10 in a small space such as the inside of a cage, it is possible to inhibit the occurrence of troubles, for example, where the tray 20 obliquely slides and is caught by the main body portion 10 at the rear side portion of the tray 20. Accordingly, in the animal litter box 3 configured with two members, namely the main body portion 10 and the tray 20, it is possible to more stably move in and take out the tray 20.

Figure 14A:
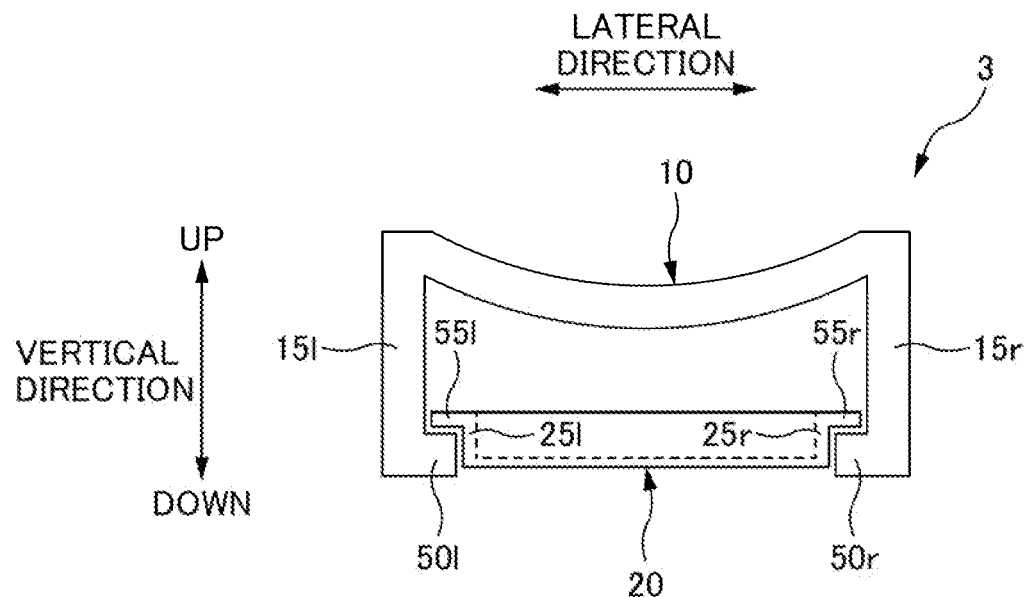
FIGS. 14A and 14B are schematic cross-sectional views illustrating modified examples of the animal litter box 3.
Figure 14B:
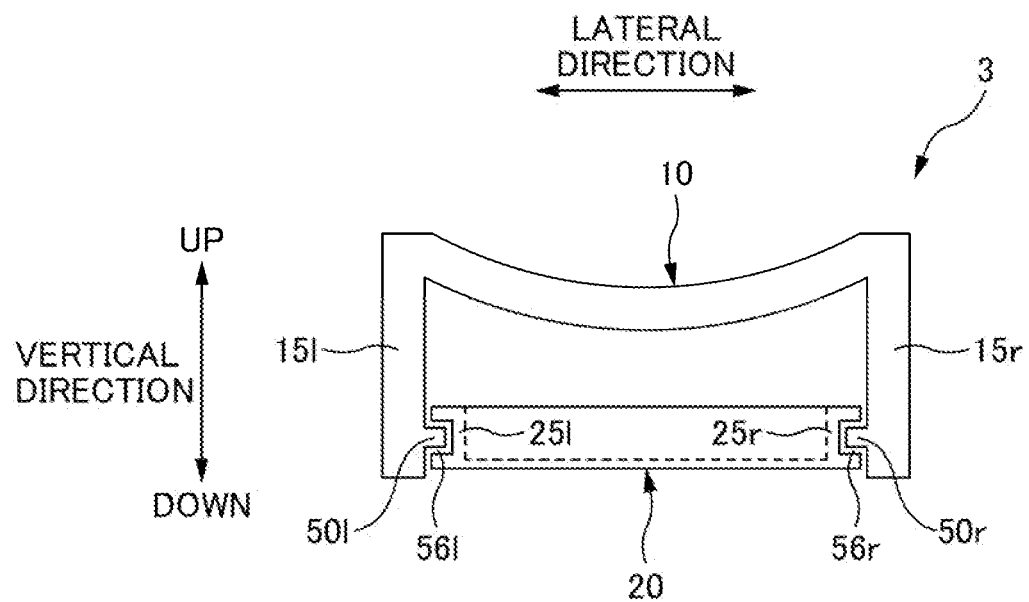

Furthermore, in the animal litter box 3, the shape of the tray 20 may be changed as follows. FIGS. 14A and 14B are schematic cross-sectional views illustrating modified examples of the animal litter box 3.

In the example shown in FIG. 14A, guide receiving portions 55r and 55l are formed at the upper end portions of the side-wall portions 25r and 25l of the tray 20. The guide receiving portions 55r and 55l are portions that protrude outward in the lateral direction respectively from the upper ends of the side-wall portions 25r and 25l. When the tray 20 is accommodated in the main body portion 10, the lower surfaces of the guide receiving portions 55r and 55l of the tray 20 respectively come into contact with the upper surfaces of the guide portions 50r and 50l of the main body portion 10 in a slidable manner. In this modified example, the tray 20 can slide in the front-rear direction in a state of being supported in the vertical direction by the guide portions 50r and 50l. Therefore, the tray 20 can more stably slide.

On the other hand, in the example shown in FIG. 14B, the outer surfaces of the side-wall portion 25r and 25l of the tray 20 in the lateral direction are provided with groove portions 56r and 56l that fit the shape of the guide portions 50r and 50l. As shown in FIG. 14B, the guide portions 50r and 50l are respectively loosely fitted into the groove portions 56r and 56l, making it easier to slide the tray 20 along the guide portions 50r and 50l. Furthermore, in this modified example, the movement of the tray 20 in the front-rear direction is restricted by the groove portions 56r and 56l and the guide portions 50r and 50l. Therefore, the tray 20 can more stably slide.

In the example shown in FIGS. 14A and 14B, at least the tray 20 is supported upward in the vertical direction from the lower side by the guide portions 50r and 50l. Therefore, the bottom portion of the tray 20 does not have to be in contact with a ground plane (for example, a floor or platform) on which the animal litter box 3 is placed. That is, the tray 20 can be slid in a state of being floated from the plane, and this reduces the frictional force generated when the tray 20 is slid, making it possible to easily move in or take out the tray 20.

OTHER EMBODIMENTS

Although the above embodiments of the present invention have been described, but the above-described embodiments are intended to facilitate the understanding of the present invention and are not intended to limit the interpretation of the present invention. In addition, the present invention can be modified or improved within the scope of the gist of the present invention, and it is needless to say that equivalents thereof are included in the present invention. For example, the following modifications are possible.

In the embodiments described above, for example, a granular excrement treating material, such as cat litter, is disposed in the lower surface portion 11 of the main body portion 10. However, the present invention is not limited thereto, and other granular substances may be disposed. Furthermore, a granular substance does not have to be disposed.

REFERENCE SIGNS LIST

1: animal litter box (first embodiment),
2: animal litter box (second embodiment),
3: animal litter box (third embodiment),
10: main body portion,
11: lower surface portion,
12: urine passing portion, 12s: hole portion,
15: side-wall portion, 15u: upper end, 15d: lower end (bottom portion),
15f: front side-wall portion, 15b: rear side-wall portion, 15bc: rear notch portion,
15r: right side-wall portion, 15l: left side-wall portion,
16: folded-back portion, 17: turnover portion,
18: entrance notch portion, 19: opening portion,
20: tray,
21: lower surface portion,
25: side-wall portion, 25f: front side-wall portion, 25b: rear side-wall portion, 25r: right side-wall portion, 25l: left side-wall portion,
26: handle portion, 27: protruding portion,
28: sheet accommodation portion,
281: rib,
282: rib, 282c: notch,
283: rib, 284: ceiling portion,
285: through pipe,
30: slide restriction portion,
40: notch portion,
50: guide portion, 55: guide receiving portion, 56: groove portion,
200: absorbent sheet

The invention claimed is:

1. An animal litter box having a front-rear direction, a lateral direction, and a vertical direction intersecting each other,
the animal litter box comprising: a main body portion and a tray,
the main body portion having a urine passing portion through which urine passes, the main body portion having a lower surface portion and a side-wall portion that surrounds the lower surface portion, the lower surface portion being configured such that an animal performs excretion in a state of riding on the lower surface portion, the lower surface portion being provided with a plurality of holes as the urine passing portion;

the tray being a portion in which an absorbent body is installed, the absorbent body absorbing the urine that has passed through the urine passing portion, a notch portion being provided in a bottom portion of the main body portion on a rear side in the front-rear direction, the notch portion being obliquely cut so as to have a predetermined angle with respect to a horizontal plane, wherein in a state where the animal litter box is placed on the horizontal plane, each of a bottom portion of the main body portion and a bottom portion of the tray is in contact with a surface of the horizontal plane, the main body portion being capable of standing on its own while inclining to the horizontal plane at the predetermined angle, by bringing the notch portion into contact with a ground plane while the tray not being inclined.

2. The animal litter box according to claim 1, wherein a length of the tray in the front-rear direction is smaller than the length of the tray in the lateral direction, and the tray is accommodated in the main body portion by sliding in the front-rear direction.

3. The animal litter box according to claim 1, wherein the tray is capable of being accommodated in the main body portion even by being reversed in the front-rear direction.

4. The animal litter box according to claim 3, wherein the tray has a handle portion on two sides in the front-rear direction.

5. The animal litter box according to claim 4, wherein the notch portion being a portion for accommodating the handle portion.

6. The animal litter box according to claim 4, wherein in the vertical direction, a position of the urine passing portion is higher than a position of the handle portion.

7. The animal litter box according to claim 1, wherein a height of two lateral side portions of the tray is higher than a height of a lateral central part of the tray.

8. The animal litter box according to claim 1, wherein the main body portion has a restriction portion in a side-wall portion on a front side in the front-rear direction, the restriction portion being a portion that restricts movement of the tray in the front-rear direction.

* * * * *